United States Patent [19]

Tsunekawa et al.

[11] Patent Number: 4,672,189

[45] Date of Patent: Jun. 9, 1987

[54] DEVICE FOR SENSING LIGHT AND PROVIDING ELECTRICAL READOUT

[75] Inventors: Tokuichi Tsunekawa, Kanagawa; Yuichi Sato, Tokyo; Takashi Kawabata, Kanagawa, all of Japan

[73] Assignee: Canon Kabushiki Kaisha, Tokyo, Japan

[21] Appl. No.: 667,012

[22] Filed: Nov. 1, 1984

[30] Foreign Application Priority Data

| | | | |
|---|---|---|---|
| Nov. 4, 1983 | [JP] | Japan | 58-207768 |
| Nov. 4, 1983 | [JP] | Japan | 58-207769 |
| Nov. 8, 1983 | [JP] | Japan | 58-209559 |
| Nov. 11, 1983 | [JP] | Japan | 58-211920 |

[51] Int. Cl.$^4$ ................................. G01J 1/20
[52] U.S. Cl. .................... 250/201; 250/214 B
[58] Field of Search ......... 250/201 AF, 204, 214 AF, 250/214 B; 354/402

[56] References Cited

U.S. PATENT DOCUMENTS 4,522,492  6/1985  Masunaga .................... 250/211 AF

*Primary Examiner*—Gene Wan
*Attorney, Agent, or Firm*—Toren, McGeady & Associates

[57] ABSTRACT

The disclosed device responds to pulsed light from a light source to produce electrical signals. A photo-electric transducer element uses a number of signal storage sites on which successive signals from the photo-electric transducer element are accumulated. A signal flow circuit transfers the stored signals from one of the signal storage sites to another in synchronism with the energization and de-energization of the light source. Simultaneously, those signals produced when the light source is energized are accumulated on a common storage site. The other signals produced when the light source is not energized are accumulated on another common storage site. When performing a computation on the basis of an electrical readout of one set of stored signals and another electrical readout of another set of stored signals, the different characteristics of the different storage site prevent inaccurate results.

12 Claims, 12 Drawing Figures

F I G. 7(a)
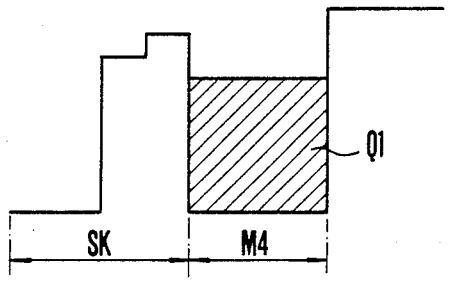
SK  M4
F I G. 7(b)
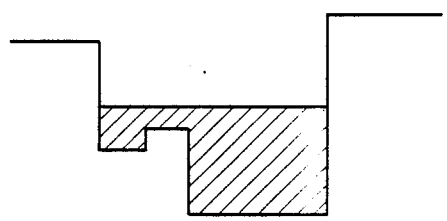
F I G. 7(c)
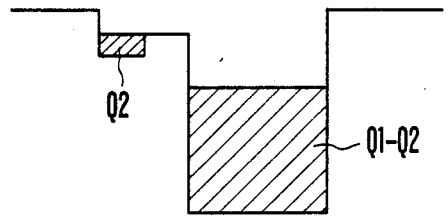
F I G. 7(d)
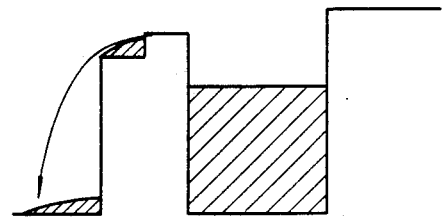

DEVICE FOR SENSING LIGHT AND PROVIDING ELECTRICAL READOUT

BACKGROUND OF THE INVENTION

1. Field of the Invention:

This invention relates to devices for sensing light and developing electrical signals representative of the received light, and more particularly to devices for sensing light of a light source as reflected by an object and providing an electrical readout necessary for focusing a focusing apparatus.

2. Description of the Prior Art:

A focusing apparatus utilizes a plurality of photo-electric transducer elements responsive to the reflection of radiation from a light source from an object for producing electrical signals. Known systems include circuits for computing the differences in signals between two successive elements. A determination of either the distance from the apparatus to the object or the focusing condition of an objective lens is based on these computed differences. Such systems are shown, for example, in U.S. Pat. Nos. 4,032,934 (issued June 28, 1977), 4,268,137 (issued May 19, 1981) and 4,357,085 (issued Nov. 2, 1982). In this type of apparatus, however, the accuracy of determination rapidly decreases for distant objects, and the ambient light causes the photo-electric transducer elements to produce spurious noise signals which may mask actual signals at a low level. It is, therefore, of great importance to solve such problems.

Attempts have been made to take into account these problems, for example, as proposed in U.S. Pat. No. 4,315,159 (issued Feb. 9, 1982). This light responsive device provides an electrical readout by using two signal storing circuits for every one photo-electric transducer element. The signal storing circuits are arranged so that those photo signals from the transducer element generated when the light source is energized, that is, photo signals of the metering light plus ambient light or complex light dependent signals, are accumulated on one of the two storing circuits. Accumulated on the other storing circuits are other photo signals, the ambient light dependent signals, generated when the light source is not energized. During a certain integration period, the output signals from the storing circuits are computed to obtain information necessary for focusing.

In this prior known light responsive electrical readout device the complex and ambient photo signals are stored in different circuits. The signal storing characteristic is not always uniform from circuit-to-circuit. The object distance is evaluated by subtracting one of the outputs of the storing circuits from the other. Accordingly, it becomes impossible to remove only the influence of the ambient light. Therefore, information responsive only to the metering light cannot be read out. This lowers the discrimination ability of the focusing apparatus.

SUMMARY OF THE INVENTION

With the foregoing in mind, the present invention has as an object to provide a device for sensing light and providing an electrical readout of high accuracy in accordance with the projected light.

Another object of the present invention is to provide a light sensing device capable of assisting in achieving improvement of the accuracy of discrimination of a focusing apparatus employing the same.

Other objects of the invention will become apparent from the following description of embodiment thereof.

BRIEF DESCRIPTION OF THE DRAWINGS

FIGS. 7(a) to 7(d) are diagrams explaining the operation of the charge computer of FIG. 6.

DETAILED DESCRIPTION OF THE PREFERRED EMBODIMENTS

Figure 1:
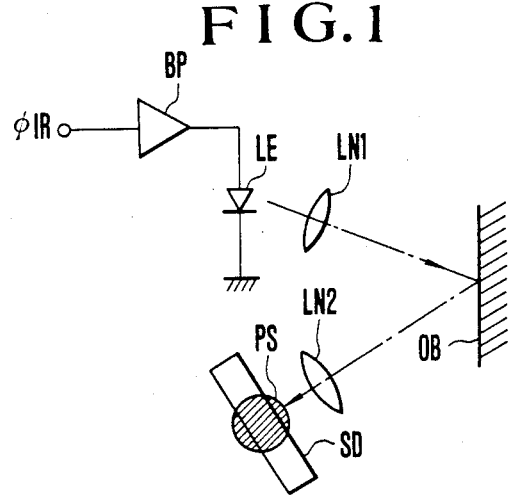
FIG. 1 is a schematic view of an example of the focusing apparatus to which the present invention is applicable.

In FIG. 1, there is shown a focusing apparatus having a light source LE, for example, a laser-emitting diode, connected through a buffer BP to clock pulses $\phi IR$ so that pulsated radiation is produced. The radiation from the light source LE is projected by a lens LN1 onto an object OB, and the reflection of the radiation from the object OB is focused by a collection lens LN2 as a spot image PS on a photosensitive surface of a sensor SD. The position of the spot image PS is then detected by processing the output of the sensor SD, representing the distance from the apparatus to the object OB or the focusing condition of an objective lens (not shown). Since the sensor SD always receives the reflection of the ambient light from the object OB, the efficiency of removing the ambient light dependent information from the output of the sensor SD largely affects improvement of the accuracy of focusing control.

Figure 2:
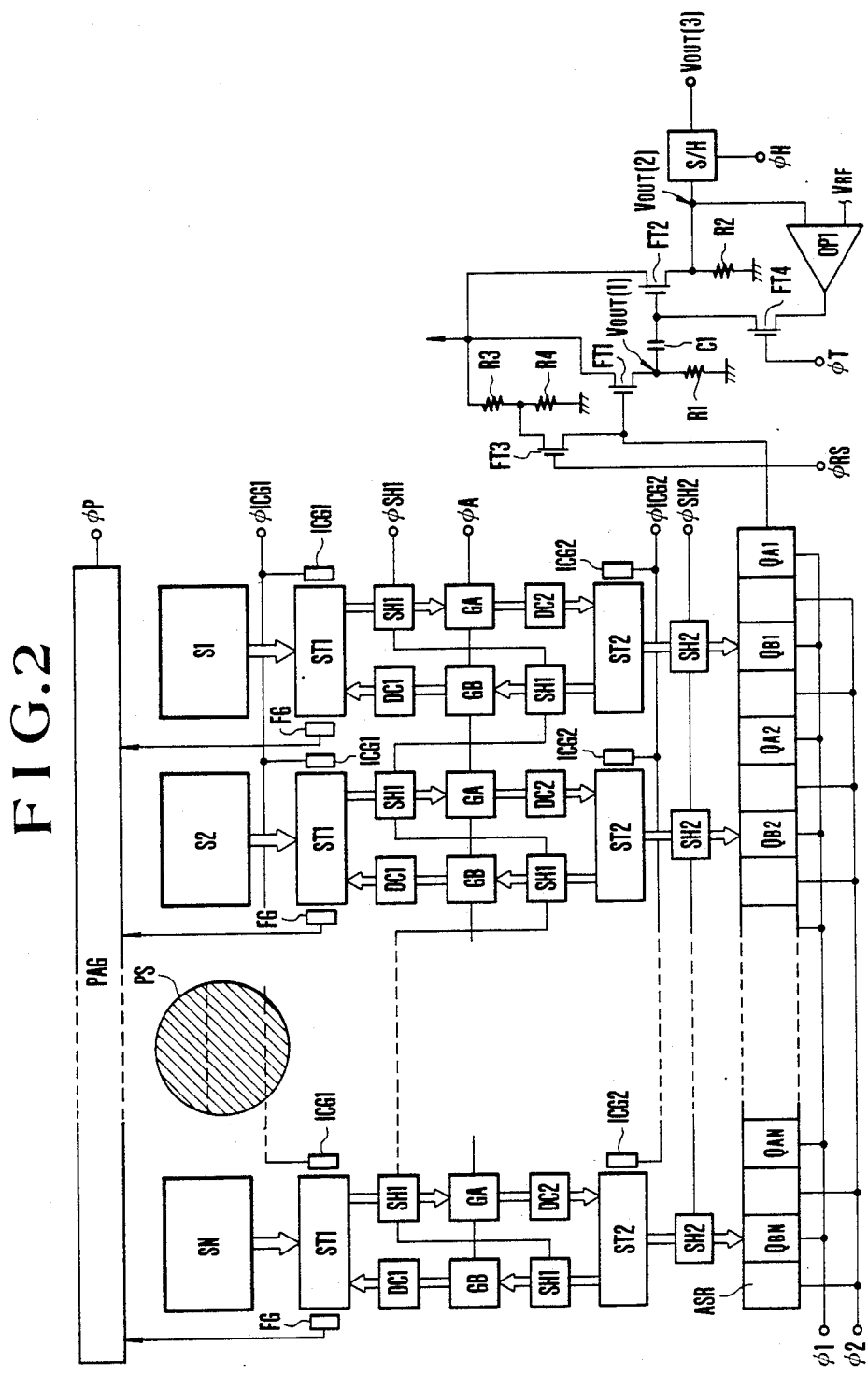
FIG. 2 is a block diagram of an embodiment of a light sensing device according to the invention.

In FIG. 2, square resolution cells S1 to SN in the photosensitive surface of the sensor SD convert the impinging light into a proportional electrical charge. For every one cell, there are provided a first charge storage site ST1 and a second charge storage site ST2, which are connected to each other through charge transfer gates SH1 and SH2, barrier gates DC1 and DC2 to which a D.C. voltage is applied, and charge shifting regions GA and GB. Clear gates ICG1 and ICG2 clear unnecessary charges; FG is a floating gate for non-destructive detection of the charge accumulated on the first charge storage site ST1. These parts are also provided for every one cell. An analog shift register ASR, for example, a CCD, reads out signals. A computer circuit is composed of field effect transistors FT1 to FT4, resistors R1 to R4, a condenser C1, an operational amplifier OP1 having a non-inverting input to which is applied a reference voltage VRF, with the FT4 connected in the feedback network thereof, a sample and hold circuit S/H, and an AGC circuit PAG responsive to attainment of the peak value of the output of each floating gate FG to a certain critical level for producing, for example, signal readout information at an output terminal φP. Elements φICG1, φSH1, φA, φICG2 and φSH2 are control terminals for ICG1, SH1, GA(GB), ICG2 and SH2 respectively, and φ1 and φ2 are control terminals of the analog shift register ASR. Also, φRS is a control terminal for controlling when the transistor FT3 resets the unnecessary charge produced from the analog shift register ASR. A is a control terminal φt controls the short-circuting of the transistor FT4 which acts as a gate voltages. Vout(1), Vout(2) and Vout(3) appear at the points indicated in FIG. 2. For note, all the terminals are given respective trains of pulses in timed relationship as shown in FIG. 3.

Signals $Q_{A1}, Q_{A2}, \ldots, Q_{AN}$ correspond to the charges generated in the resolution S1, S2, ..., SN respectively when the light source LE is lit, and signals $Q_{B1}, Q_{B2}, \ldots, Q_{BN}$ correspond to the charges generated in the resolution cells S1, S2, ..., SN respectively when the light source LE is lit off. These signals $Q_{A1}$ to $Q_{AN}$ and $Q_{B1}$ to $Q_{BN}$ take their places in the analog shift register ASR as shown in FIG. 2 and are shifted in sequence to the right.

Figure 3:
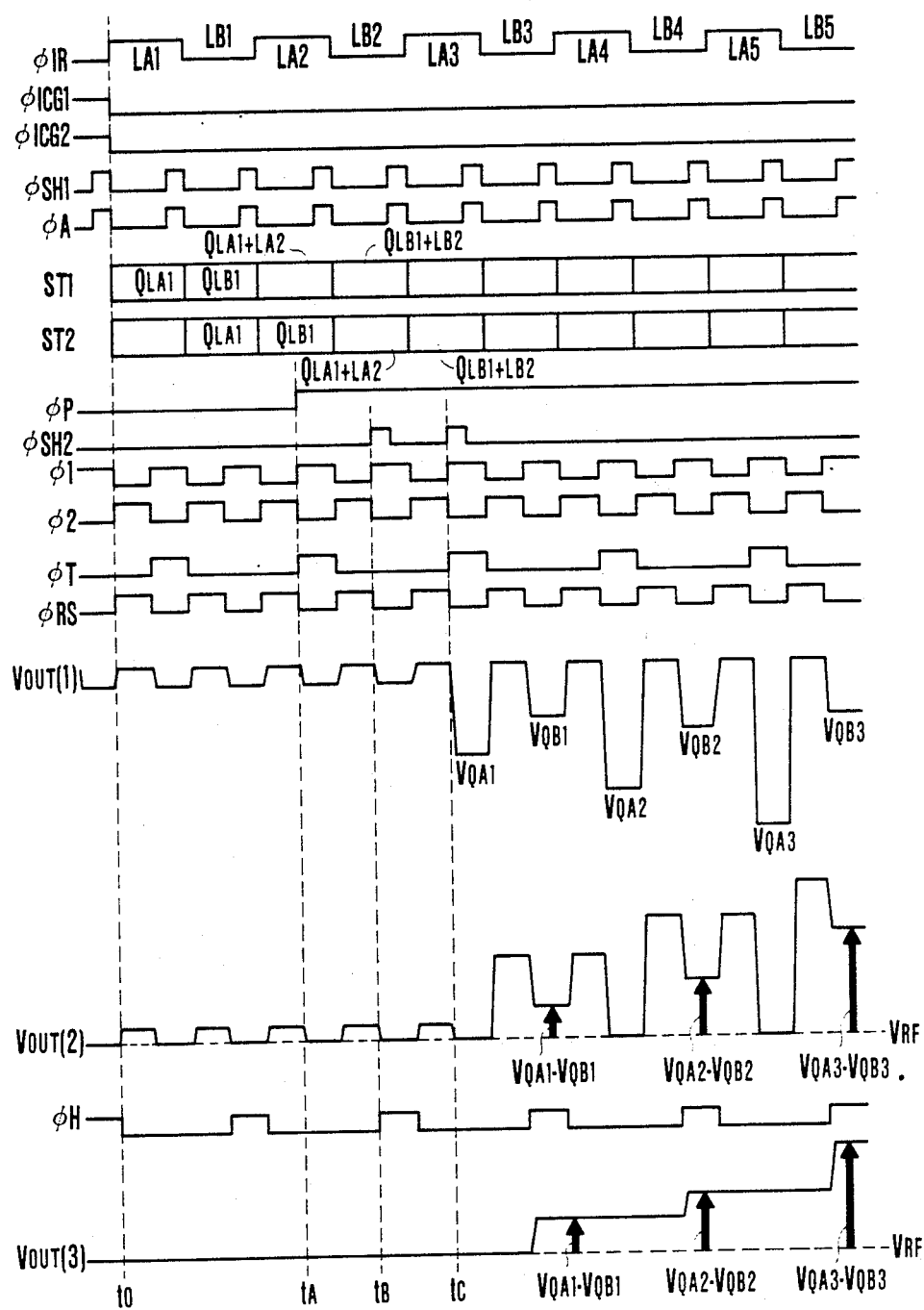
FIG. 3 is a pulse timing chart illustrating a manner in which the device of FIG. 2 operates.

Referring to FIG. 3, at time t0, φICG1 and φICG2 change from high level to low level, causing the clear gates ICG1 and ICG2 to stop clearing the storage sites ST1 and ST2 of charge. From this time onward, therefore, the first storage sites ST1 start to collect the charge from the cells S1 to SN. During an integration period LA1 the φIR takes high level, the light source LE is energized to emit radiation, and an image PS of the illumination spot on the object is formed on the photosensitive surface of the sensor SD. Therefore, the cells S1-SN develop charges $Q_{LA1}$ each in accordance with the sum of the reflections of the radiation and the ambient light from the object impinging thereon, the charges being transferred to and accumulated on the respective storage sites ST1. Just before the termination of the period LA1, the φSH1 and φA changes to high level, whereby the charges on the storage sites ST1 are shifted once to respective locations GA. Then, when the φSH1 and φA return to low level in synchronism with the falling edge of the pulse φIR, the charges $Q_{LA1}$ are moved from the locations GA and stored in the second storage sites ST2. During the next integration period LB1 the φIR takes low level, and the light source LE is de-energized to not emit radiation. Therefore, the charges $Q_{LB1}$ the cells S1-SN develop are representative only of the reflection of the ambient light from the object, being transferred to and accumulated at the first storage cites ST1. Just before the termination of the second integration period, the φSH1 and the φA change again to high level, whereby the charges on the first and second storage sites ST1 and ST2 are transferred to and kept in the locations GA and GB for a moment respectively. Then when the φSH1 and φA return again to low level, the charges $Q_{LB1}$ are transferred to and stored in the second storage sites ST2, while the charges $Q_{LA1}$ reoccupy the first storage sites ST1. During the next or third integration period LA2, therefore, the charges developed are added to the respective charges which were developed during the first period LA1. It is to be understood that as such operation is recycled, a sequence of photo signals for radiation plus ambient light and another sequence of photo signals for ambient light only while circulating past the first and second storage sites ST1 and ST2 are successively summed up in each set on either one of the two storage sites ST1 and ST2.

Now assuming that one of the outputs of the floating gates FG reaches a critical level at time tA, then the AGC circuit PAG changes its output φP to high level, making a signal readout pulse φSH2 ready to occur. At a time tB, a first pulse φSH2 is supplied to the gates SH2. As the second storage sites ST2 have, at this time, charge packets $Q_{LA1+LA2}$ for the metering radiation, that is, photo signals $Q_{A1}, Q_{A2}, \ldots, Q_{AN}$, they are shifted down in a parallel fashion to the analog shift register ASR. Then, at a time tC, a second pulse φSH2 is supplied to the gates SH2, whereby charge packets $Q_{LB1+LB2}$ for the ambient light, that is, photo signals $Q_{B1}, Q_{B2}, \ldots, Q_{BN}$ which have so far been transferred from the first to the second storage sites ST2, are shifted in a parallel fashion to the analog shift register ASR. It also occurs at this time tC that, in synchronism with the rising edge of a pulse φ1, the photo signals $Q_A$ are serially shifted to the right and the first photo signal $Q_A$ is read out through a charge-to-voltage converter circuit comprised of the field effect transistor FT1 and the resistor R1 to produce a voltage $V_{QA1}$ of magnitude proportional to the charge $Q_{A1}$ at an output Vout(1). Then when the pulse φ is changed to and maintained at low level, as the reset pulse φRS becomes high level, the preceding readout bit of information is cleared out of the last stage of the shift register ASR. It also occurs at this time that another pulse φ changes to high level, by which the charge packets in the analog shift register ASR are serially shifted one stage to the right. As such procedure repeats itself, successive bits of image information are read out in the form of voltages $V_{QB1}$, $V_{AQ2}$, $V_{QB2}$ and so on. In the meantime, at the time tC, a clock φT changes from low to high level, whereby the feedback circuit of the operational amplifier OP1 is closed to cause a voltage almost equal to the reference voltage VRF to appear at the output Vout(2). Therefore, this voltage is subtracted from the voltage $V_{QA1}$ at the first output Vout(1), the resultant difference voltage being stored on the condenser C1. Then, as the φT is changed to and maintained at low level, when the $V_{QB1}$ is read out, and subtracted from the voltage $V_{QA1}$, an actual signal for the pure radiation received by the first resolution cell S1 appears at the output Vout(2) in the form of a difference voltage $V_{QA1} - V_{QB1}$. Such readout procedure is repeated until the last photo signal from the n-th resolution cell SN is read out. The thus-obtained electrical readouts from all the resolution cells S1 to SN can be used as the true signals responsive only for the reflection of the radiation detected therewith. These signals are then sampled and held by the circuit S/H in synchronism with the sampling pulses φH, appearing in the form of a continuous variation of voltage at the output Vout(3).

It should be explained in connection with the method of cancelling the ambient light dependent signal component that when the $V_{QA1}$ is produced at the Vout(1), the transistor FT4 is short-circuited in response to the pulse φT so that the potential at the Vout(2) is fixed to the reference level VRF. At this time, therefore, the condenser C1 stores a voltage equal to the difference between the $V_{QA1}$ and the VRF. With the transistor FT4 then opened, when the $V_{QB1}$ is produced at the Vout(1), the output at the Vout(2) takes a value expressed as:

$$Vout(2) = V_{A1} - V_{B1} + VRF$$

Thus, the radiation signal is accurately extracted in the form of a voltage representing the difference between the values $V_{A1}$ and $V_{B1}$ superimposed on the common background voltage VRF. After that, such procedure is repeated while computing subtraction between the successive two of the photo signals with high accuracy.

Another embodiment of the invention is next described by reference to FIG. 4. The reflection of the radiation of the light source LE from the object OB is detected by a sensor SD whose light receiving area is divided into at least two parts. Based on the difference between the outputs from these two areas, either the distance to the object OB or the focusing condition of an objective lens (not shown) is found. This embodiment is, therefore, suited to be used in the so-called difference type focusing apparatus. Its feature is that a circuit for recycling successive photo signals representative of the radiation plus ambient light reflection and successive photo signals representative of the ambient light reflection alone is provided not for each of the light receiving areas, but in common for all of the areas. In connection with the aforesaid focusing apparatus, it is to be noted that determination of image sharpness is made by comparing the radiation-extracted readout, say A, from one of the two areas of the light receiving surface with the radiation-extracted readout, say B, from the other area. Detection of A=B, is taken as an in-focus condition, detection of A>B, for example, as a far focus, and detection of A<B as a near focus. It is also to be noted that the timing of the start of this determination may be adjusted to coincide with attainment of A+B to a prescribed constant value so that the gradient of A−B near sharp focus becomes almost constant. This is desirable from the standpoint of maintaining the accuracy of in-focus detection at a constant high level.

Figure 4:
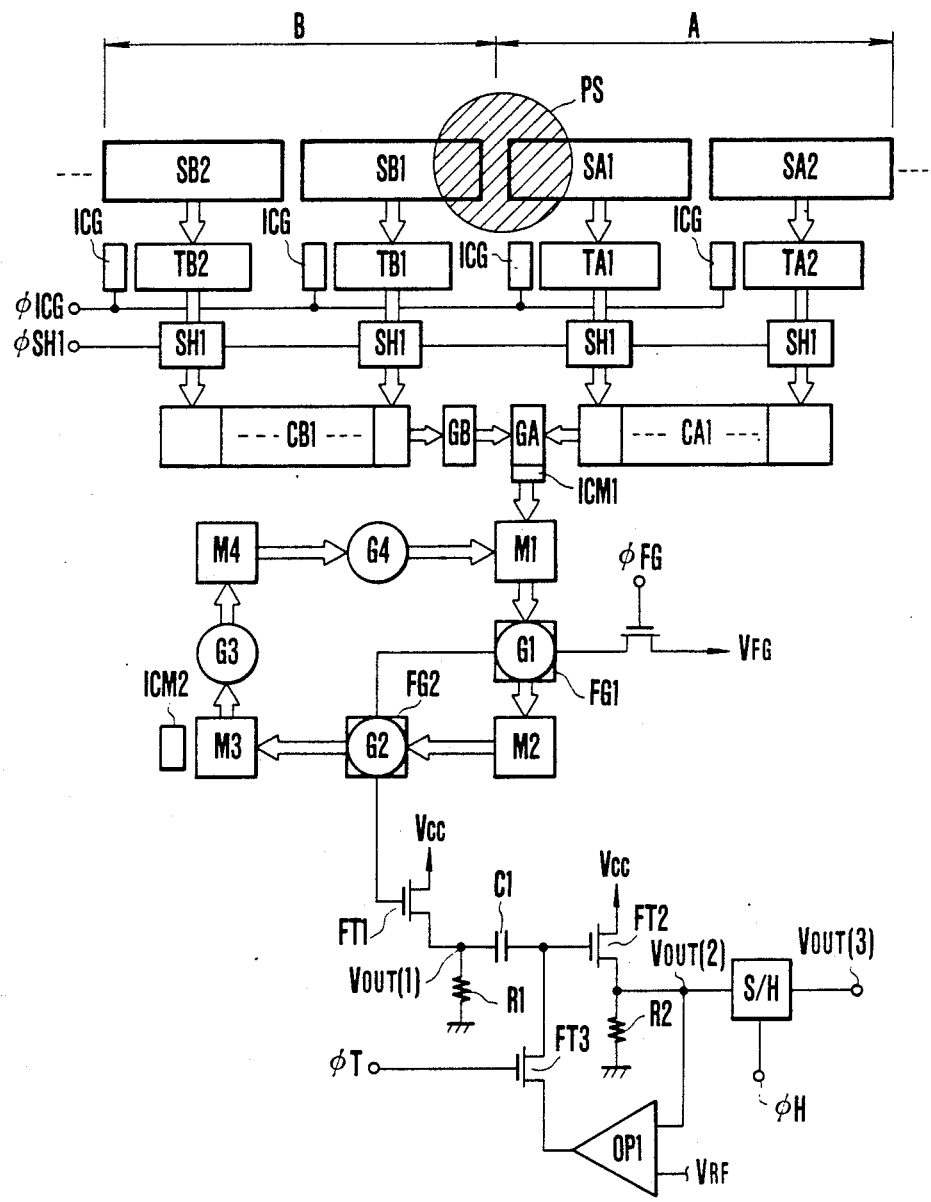
FIG. 4 is a block diagram of another embodiment of a light sensing device according to the invention.

In FIG. 4, SA1, SB1 are photo-electric transducer portions constituting a first zone A and a second zone B respectively when the photosensitive surface of the photoelectric transducer element SD of FIG. 1 is divided into two; SA2, SB2 are photo-electric transducer portions supplementarily provided to respective zones A, B for improving the detection ability. These photo-electric transducer portions SA2, SB2 may be either omitted, or each increased to two or more in number. Also the function of the photoelectric transducer portions SA2, SB2 is similar to that of the photo-electric transducer portions SA1, SB1. First and second charge storing portions TA1 and TA2 store the charges generated in the photo-electric transducer portions SA1 and SB1 as the photo-electric conversion information; TA2 and TB2 are charge storing portions provided in correspondence to the photo-electric transducer portions SA2 and SB2 if supplementarily provided.

The use of four photo-electric transducing portions SA1, SA2, SB1 and SB2 in a horizontal row provides increased possibility of the radiation spot image PS taking its place at any one of the photo-electric transducing portions even when the object image is largely out of focus. As a result, the possible range of detection of object distances can be extended, because the position of the radiation spot image PS can be sensed accurately despite a large increase of the sharpness of the image.

When the number of photo-electric transducing portions is 4, the charges produced from, for example, two photo-electric transducing portions SA1 and SA2 may be considered to be one charge in later treatment thereof.

Also, when the fact that the radiation spot image PS lies within the combined zone of the two photo-electric transducing portions SA1 and SB1 is detected from the output charge amounts of all the photo-electric transducing portions SA1, SA2, SB1 and SB2, the other two photo-electric transducing portions SA2 and SB2 may be rendered inoperative. If so, the S/N ratio can be preferably increased.

An integration clear gate ICG clears the charges produced from the photo-electric transducing portions SA1, SA2, SB1, SB2 when the pulse $\phi$ICG is of high level; SH1 is a charge shift gate for shifting the charge stored in the charge storing portion TA1, TA2, TB1, TB2 to a charge transfer portions CA1, CB1 having a CCD analog shift register. The charges transferred the charge transfer portions CA1, CB1 are serially shifted. The charge from CA1 after having passed through a charge transfer portion GA and the charge from CB1 after having passed through charge transfer portions GB and GA in sequence are stored in a charge storing portion M1. Thereby, the charge from CA1 and the charge from CB2 are always transferred to the storing portion in this order. The charge stored in the storing portion M1 is sent out from M1 when the next charge is transferred thereto, being transferred successively through charge transfer portions G1, G2, G3 and G4 provided to form a recycling circuit of charge storing portions M2, M3 and M4. The transfer portions G1–G4 have a function of having once stored the charge from one storing portion and then transferring it to another storing portion.

Floating gates FG1 and FG2 are reset to a reference voltage VFG when a pulse $\phi$FG is high level. The outputs of the floating gates FG1 and FG2 are placed onto an output line of a circuit comprising field effect transistor FT1 to FT3, resistors R1 and R2, a condenser C1 and an operational amplifier OP1 having a non-inverting input terminal to which the reference voltage $V_{RF}$ is applied with the gate FT3 connected in the feedback circuit thereof. The necessary information is sampled and held by a sample and hold circuit S/H in synchronism with a sampling pulse $\phi$H.

Clear gates ICM1 and ICM2 are for the charge transfer portion GA and the charge storing portion M3 respectively.

The parts G1 to G4 and M1 to M4 are arranged so that the recyclic transfer of the charges is controlled by pulses $\phi$G1 to $\phi$G4 and $\phi$M1 to $\phi$M4 as these pulses are applied to the G1 to G4 and M1 to M4.

Figure 5:
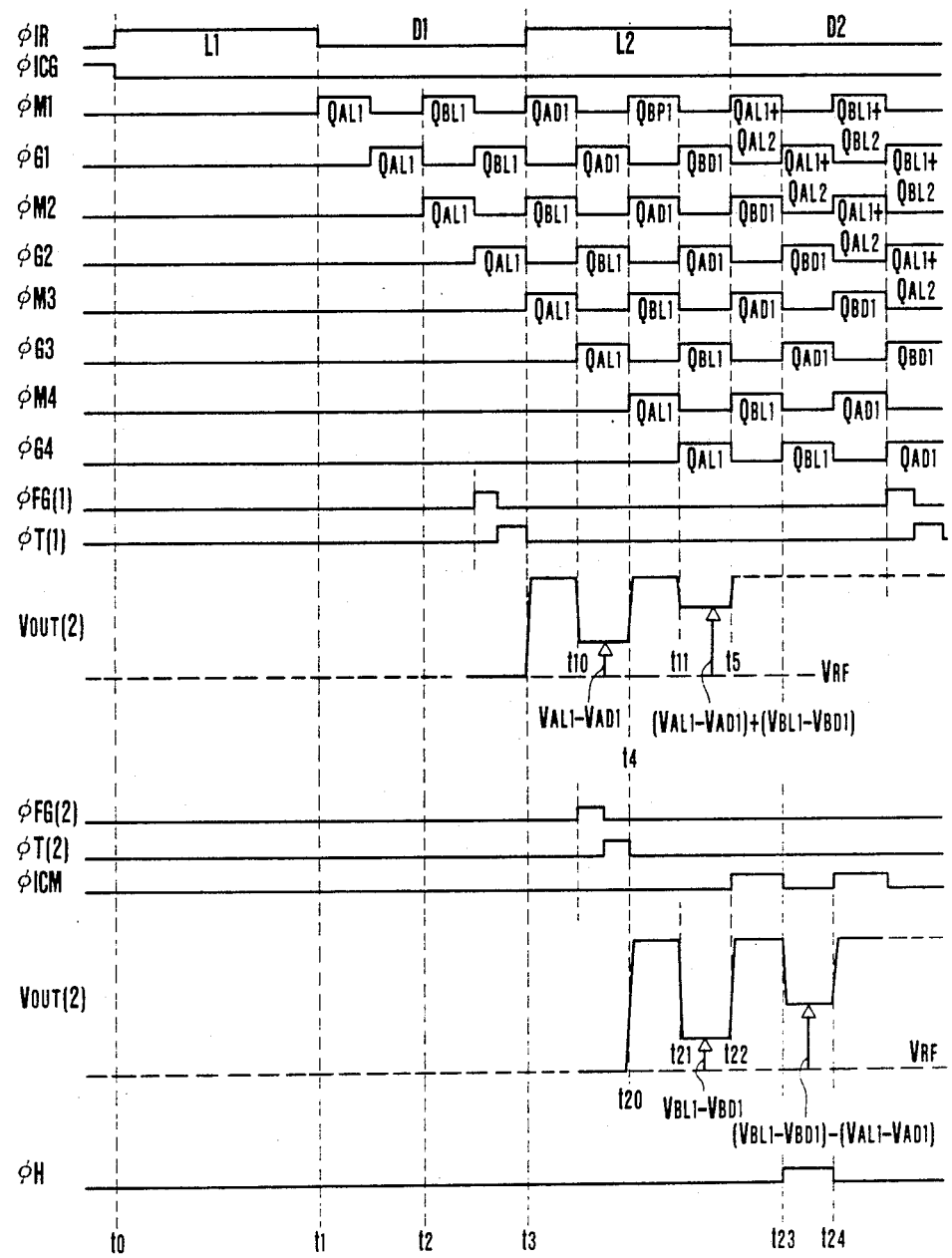
FIG. 5 is a pulse timing chart illustrating a manner in which the device of FIG. 4 operates.

Referring to FIG. 5, when the $\phi$ICG changes to a low level at of time t0, the charges generated in the photo-electric transducing portions SA1, SA2, SB1, SB2 start to be accumulated on the charge storing portions TA1, TA2; TB1, TB2. During an integration period L1 the $\phi$IR takes high level to energize the light source LE, and a radiation spot image PS is formed on the photo-electric transducer. Therefore, the zones A and B of the photo-electric transducer generate charges $Q_{AL1}$ and $Q_{BL1}$ respectively proportional to the sums of the reflections of the projected radiation and the ambient light impinging thereon. Charges $Q_{AL1}$ and $Q_{BL1}$ are transferred to and accumulated on the respective storing portions TA1, TA2; TB1, TB2. After that, when the $\phi$SH1 becomes high level, the charges $Q_{AL1}$ and $Q_{BL1}$ are transferred to the charge shifting portions CA1 and CB1 respectively.

At a time t1, when the $\phi$IR changes to a low level, the light source LE no longer emits radiation, so that the photo-electric transducer is responsive to the reflection of the ambient light alone. The corresponding charges $Q_{AD1}$ and $Q_{BD1}$ are accumulated on the charge storing portions TA1, TA2; TB1, TB2. At the same time, the light information $Q_{AL1}$ which was produced from the zone A during the first period L1 is transferred through the CA1 and GA and stored in the storing portion M1 constituting part of the recycling circuit. Then, at a time t2, the information $Q_{AL1}$ stored on the M1 is transferred through the G1 and stored in the M2, while the light information $Q_{BL1}$ which was produced from zone B during the first period L1 is transferred through the CB1, GB and GA and stored in the storing portion M1. Then, the information stored in the charge storing portions M2 and M1 are transferred to the charge storing portions M3 and M2 respectively. Also, during the second period D1, the light information QAD1 is accumulated on the charge storing portion M1 from the zone A through the CA1 and GA. At a time t3, the light source LE is lit again. The photo-electric transducer generates charges $Q_{AL2}$, $Q_{BL2}$ in accordance with the sum of the reflections of the metering light and the ambient light impinging thereon, which charges are accumulated on the charge storing portions TA1, TA2; TB1, TB2. At a time t4 during the period after the information stored on the charge storing portions M3, M2 and M1 have been transferred to the charge storing portions M4, M3 and M2 respectively, the light information $Q_{BD1}$ which was produced from the zone B during the second period D1 with no projection light, is transferred through the CB1, GB and GA and stored in the charge storing portion M1. Then, at a time t5, the light information $Q_{AL1}$, $Q_{BL1}$, $Q_{AD1}$, $Q_{BD1}$ stored on the charge storing portions M4, M3, M2 and M1 are transferred respectively to the charge storing portions M1, M4, M3 and M2, and the light information $Q_{AL2}$ which was produced from the zone A during the integration period L2 with emission of radiation is stored in the charge storing portion M1. At this time, therefore, the charge storing portion M1 collects the light information $Q_{AL1}$ and $Q_{AL2}$ in addition. Similarly, the sum of the light information $Q_{AL1}$ and $Q_{AL2}$, the sum of the light information $Q_{AD1}$ and $Q_{AD2}$, the sum of the light information $Q_{BD1}$ and $Q_{BD2}$, and so on are stored successively while being recycled.

This stored information is read out through the floating gates FG1 and FG2 as follows:

For example, when the reset pulses $\phi FG$ and $\phi T$ are produced as $\phi FG(1)$ and $\phi T(1)$ as shown in FIG. 5, the sum of the charges $Q_{AL1}$ and $Q_{BL1}$ which are now contained in the G2 and G1 are read out in the form of a proportional voltage $V_{AL1}+V_{BL1}$ appearing at the output Vout(1). Since the voltage at the Vout(2) is fixed to the $V_{RF}$, a voltage corresponding to the difference between the sum of $V_{AL1}+V_{BL1}$ and the reference voltage $V_{RF}$ is held on the condenser C1. During a subsequent interval from the time t3 to a time t10, because the charges of the G1 and G2 are in transfer to the M2 and M3 respectively, the value of the voltage at Vout(2) becomes $V_{RF}+V_{AL1}+V_{BL1}$.

During the subsequent interval from the time t10 to the time t4, because the charges $Q_{BL1}$ and $Q_{AD1}$ enter the G2 and G1, the Vout(2) becomes $$Vout(2) = V_{RF} + V_{AL1} + V_{BL1} - V_{BL1} - V_{AD1}$$
$$= V_{RF} + V_{QAL1} - V_{QAD1}$$

Similarly, during the interval from the time t4 to a time t11, $$Vout(2) = V_{RF} + V_{AL1} - V_{AD1} + V_{BL1} + B_{AD1}$$
$$= V_{RF} + V_{AL1} + V_{BL1}$$

During the interval from the time t11 to the time t5, $$Vout(2) = V_{RF} + V_{AL1} + V_{BL1} - V_{AD1} - V_{BD1}$$
$$= V_{RF} + (V_{AL1} - V_{AD1}) + (V_{BL1} - V_{BD1})$$

That is, on the background of the reference voltage $V_{RF}$, a signal representing the sum of the true radiation received on the zone A and the true radiation received on the zone B can be obtained. Then, when this signal reaches a prescribed level, pulses $\phi FG(2)$, $\phi T(2)$ and $\phi ICM$ are produced. When $\phi ICM$ is high level, the information transferred to the GA through the ICM1 gate is cleared. Therefore, the true radiation signal difference can be detected as follows: During the interval t20-t21, $$Vout(2) = V_{RF} + V_{BL1} + V_{AD1}$$

During the interval t21-t22, $$Vout(2) = V_{RF} + V_{BL1} + V_{AD1} - V_{AD1} - V_{BD1}$$
$$= V_{RF} + V_{BL1} - V_{BD1}$$

During the interval t22-t23, $$Vout(2) = V_{RF} + V_{BL1} - V_{BD1} + V_{AD1} + V_{BD1}$$
$$= V_{RF} + V_{BL1} + V_{AD1}$$

Since the $\phi ICM$ is high level during the interval t22-t23, it is during the interval t23-t24 that the light information $Q_{LA2}$ for the period L1 is cleared. Hence, $$Vout(2) = V_{RF} + V_{BL1} + V_{AD1} - V_{AL1} - V_{BD1}$$
$$= V_{RF} + (V_{BL1} - V_{BD1}) - (V_{AL1} - V_{AD1})$$

That is, on the background of the reference voltage $V_{RF}$, a signal of the difference between the true radiation signal from the zone A and the true radiation signal from the zone B can be obtained.

The information of this difference of the true radiation signals is sampled and held by the sample and hold circuit S/H by the sampling pulse $\phi H$, until the next difference information is produced.

By moving the objective lens axially to bring this true radiation signal difference to zero, automatic focus adjustment can be carried out. It is to be noted that after the difference signal of the true radiation signals has been sampled and held by the S/H, the clear gate ICM2 is maintained at a high level. With this, the charges stored in the charge storing portions M1 to M4 are once to clear the unnecessary charges. After that, the device returns to the initial state of time t0 and then starts to operate again in a similar manner.

Figure 6:
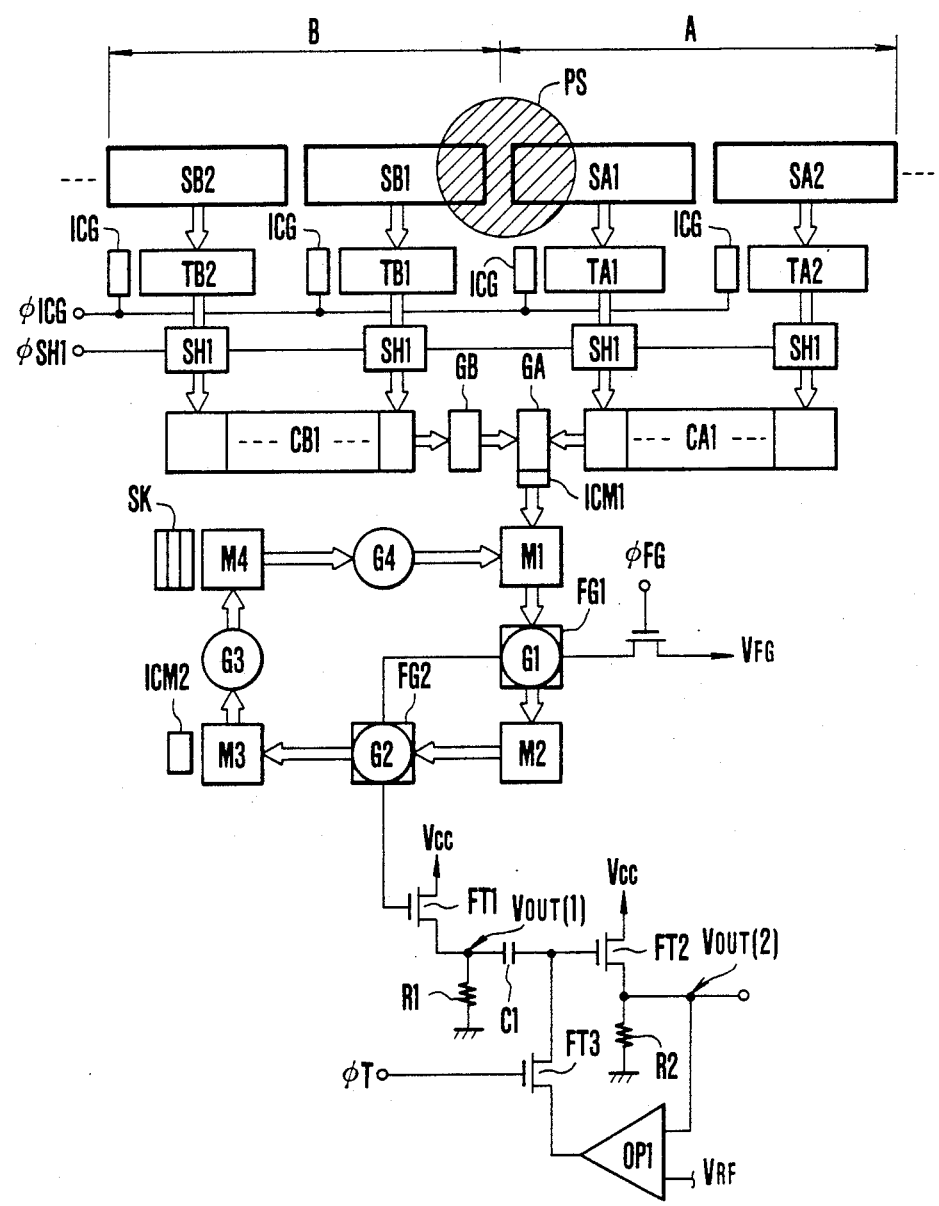
FIG. 6 is a block diagram of still another embodiment of the invention.

Next, using FIG. 6, still another embodiment of the present invention is described. This embodiment differs from the embodiment of FIG. 4 in that the charge storing portion M4 is provided with a charge removing portion SK for removing a certain amount of charge from the charge stored in the M4. The other parts are denoted by the same reference characters as those shown in FIG. 4. The SK raises and lowers a potential well so that a corresponding amount of charge Q2 to the ambient light is removed from the charge Q1 stored in the storing portion M4. This removing portion SK may be otherwise associated with any one of the other charge storing portions M1, M2 and M3 and the charge transfer portions G1, G2, G3 and G4.

FIGS. 7(a) to 7(d) schematically illustrate the operation of the potential well in the removing portion SK, where the process for removing the certain amount of charge Q2 from the charge Q1 in the M4 begins with a step of lowering the potential well of the SK and goes through steps in the order of FIGS. 7(a), 7(b), 7(c) and 7(d).

Figure 8:
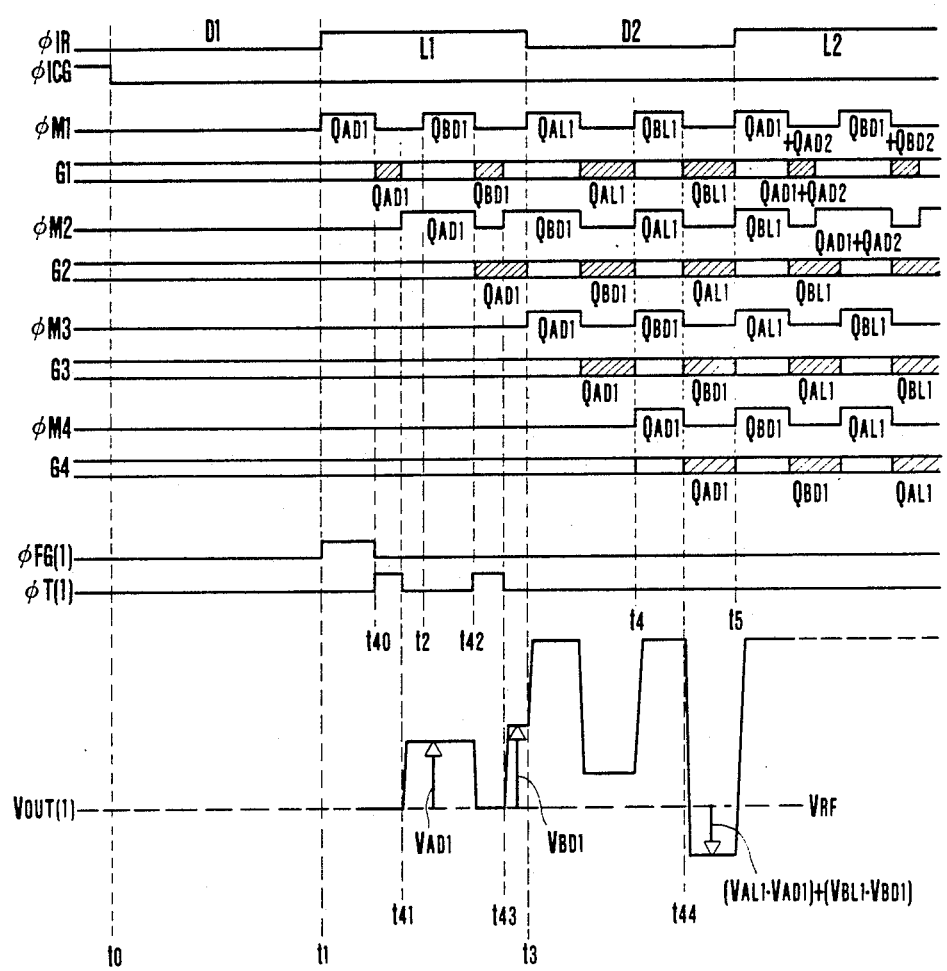
FIG. 8 is a pulse timing chart illustrating a manner in which the device of FIG. 6 operates.

In operation at a time t0 in FIG. 8, when the $\phi$ICG changes to low level, the charges generated in the photo-electric transducing portions SA1, SA2; SB1, SB2 are accumulated on the charge storing portions TA1, TA2; TB1, TB2. During the integration period D1 the $\phi$IR is low level, the light source LE gives off no radiation, and an object image is formed on the photo-electric transducer by the ambient light. At this time, therefore, the zone A and the zone B convert the ambient light impinging thereon to proportional charges $Q_{AD1}$ and $Q_{BD1}$ which are accumulated on the charge storing portions TA1, TA2; TB1, TB2. After that, when the $\phi$SH1 changes to high level, they are transferred to the charge shift portions CA1 and CB1.

At a time t1, when the $\phi$IR becomes high level, the light source LE is energized to emit radiation, whereby a radiation spot image PS is focused on the photo-electric transducer. The photoelectrically converted information $Q_{AL1}$ and $Q_{BL1}$ of the sum of the reflections of the projected radiation and the ambient light are stored in the charge storing portions TA1, TA2; TB1, TB2.

At this time, the light information $Q_{AD1}$, which was produced from the photo-electric transducing portions SA1, SA2 of the zone A, is transferred through the CA1 and GA and stored in the recyclic type storing M1. The information $Q_{AD1}$ stored in the M1 is then transferred through the G1 to the M2, and, at a time t2, the light information $Q_{BD1}$ which was produced from the photo-electric transducing portions SB1, SB2 of the zone B is transferred through the CB1, GB, GA and stored in the storing portion M1. Then, the information stored in the charge storing portions M2 and M1 are transferred to the charge storing portions M3 and M2 respectively. At a time t3, during the radiation projecting period L1, light information $Q_{AL1}$ which was produced from the photo-electric transducing portions SA1, SA2 of the zone A during the radiation projecting period L1 is transferred through the CA1 and GA and stored in the charge storing portion M1, and light source LE is turned off. Therefore, the photo-electric transducer again generates charges $Q_{AD2}$ and $Q_{BD2}$ proportional to the ambient light, which are accumulated on the charge storing portions TA1, TA2; TB1, TB2. At a time t4 after the information stored in the charge storing portions M3, M2 and M1 have been transferred to the charge storing portions M4, M3, M2 respectively, light information $Q_{BL1}$ which was produced from the photoelectric transducing portions SB1, SB2 of the zone B during the light projecting period L1 is transferred through the CB, GB and GA and stored in the charge storing portion M1.

The light information $Q_{AD1}$, $Q_{BD1}$, $Q_{AL1}$ and $Q_{BL1}$ stored in the M4, M3, M2 and M1 are transferred to the charge storing portions M1, M4, M3 and M2 respectively, and, at a time t5, light information $Q_{AD2}$ which was produced from the photo-electric transducing portions SA1, SA2 of the zone A during the ambient light integration period D2 is transferred through the CA1 and GA and stored in the charge storing portion M1. At this time, therefore, summed information of the light informations $Q_{AD1}$ and $Q_{AD2}$ is stored in the charge storing portion M1. Similarly, the sum of the light information $Q_{BD1}$ and $Q_{BD2}$, the sum of the light information $Q_{AL1}$ and $Q_{AL2}$, the sum of the light information $Q_{BL1}$ and $Q_{BL2}$ and so on are formed successively while being recycled.

This stored information is read out through the floating gates FG1 and FG2 as follows:

When reset pulses are produced as $\phi$FG(1) and $\phi$T(1) as shown in FIG. 8, the charge $Q_{AD1}$ which is at this time stored in the G1 and G2 is read out in the form of a corresponding voltage $V_{AD1}$ at the Vout(1). Because the Vout(2) is fixed to the $V_{RF}$, the condenser C1 holds a voltage corresponding to the difference between the $V_{RF}$ and $V_{AD1}$. During an interval from a time t41 to a time 42, the charge $Q_{AD1}$ of the G1 is transferred to the M2, causing the Vout(2) to change to $V_{RF}+V_{AD1}$.

Then, during an interval from the time t42 to a time t43, the charges $Q_{BD1}$ and $Q_{AD1}$ in the G1 and G2 are read out in the form of the sum of corresponding voltages or $V_{BD1}+V_{AD1}$ at the Vout(1). A voltage corresponding to the difference betwen that voltage and the reference voltage $V_{RF}$ is thus stored on the condenser C1. At this time, the output Vout(2) is fixed to the $V_{RF}$ because the $\phi$T(1) is high level. Then, during an interval t43–t3, the charge $Q_{BD1}$ of the G1 is transferred to the M2, so that Vout(2) becomes $V_{RF}+V_{BD1}$.

Then, during an interval t3–t44, the charges $Q_{AL1}$ and $Q_{BD1}$ enter the G1 and G2 and, after that, are transferred and cleared. At the time of clearing, $$Vout(2) = V_{RF} + V_{BD1} + V_{AD1}$$

During an interval t44–t5, the charges $Q_{BL1}$ and $Q_{AL1}$ enter the G1 and G2, so that $$Vout(2) = V_{RF} + V_{BD1} + V_{AD1} - V_{BL1} - V_{AL1}$$
$$= V_{RF} - [(V_{AL1} - V_{AD1}) + (V_{BL1} - V_{BD1})]$$

That is, on the background of the reference voltage $V_{RF}$, a summed signal of a pure radiation signal generated in the zone A and a pure radiation signal generated in the zone B can be obtained.

Based on such computation result, the charge removing portion SK is operated as shown in FIGS. 7(a) to 7(d).

For example, when the light information $V_{AD1}$ of the zone A produced during the interval t41–t42 without emission of radiation exceeds a certain level relative to the above-described computation result, a certain amount of ambient light information is removed from the $Q_{AD1}$ and $Q_{AL1}$ through the SK as the $Q_{AB1}$, $Q_{AL1}$ is transferred to the M4. Also, when the light information of the zone B produced during the interval t43–t3 similarly exceeds a certain level, a certain amount of ambient light information is removed from the $Q_{BD1}$ and $Q_{BL1}$ through the SK as the $Q_{BD1}$, $Q_{BL1}$ is transferred to the M4.

When the $V_{AD1}$, $V_{BD1}$ does not exceed the certain level, the potential well of the charge removing portion SK is so high that no fraction of the charge of the storing portion M4 is not removed as shown in FIG. 7(a).

When the $V_{AD1}$ or $V_{BD1}$ exceeds the certain level, as the corresponding informatin enters the M4, the potential well SK lowers in response to entrance of the corresponding information into the M4 as shown in FIG. 7(b), whereby the amount of charge is to be removed detected. Then, as shown in FIG. 7(c), that amount of charge Q2 is subtracted from the stored charge Q1, and then cast into the drain as shown in FIG. 7(d).

For this reason, the information about the ambient light is suppressed, while the information about the distance metering radiation is emphasized. Thus, the storage information of good S/N can be obtained.

Figure 9:
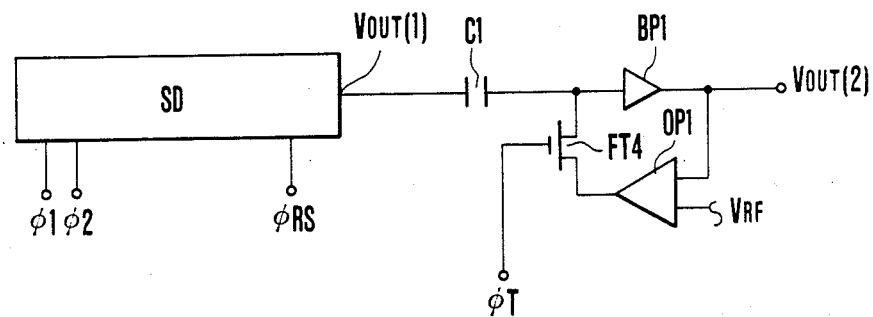
FIG. 9 is a circuit diagram of another example of the signal output circuit of each of the embodiments described above.

FIG. 9 illustrates another example of the difference signal forming circuit. In this drawing, SD is a solid state image pickup element for serially producing light information from resolution cells through an analog shift register. This solid state image pickup element SD is controlled by charge shift clock pulses $\phi 1$ and $\phi 2$ and a resetting clock pulse $\phi RS$. Even by this example of the difference circuit comprised of a condenser C1 as the charge storing element, a buffer BP1, an operational amplifier OP1 and a gate means FT4, it is possible to accurately obtain the differences between the adjacent two of the time-serially produced signals from the SD.

As has been described above, according to the present invention, various sorts of signals while being recycled through a plurality of storing portions can be stored in each sort. Therefore, the computation of one sort of stored signals with another sort of stored signals is never influenced by the characteristics of the storing portions. Therefore, in application of the present invention to focusing apparatus in which the object distance or the focusing condition of the objective lens is determined by detecting the reflection of radiation of the light source from the object, its accuracy of detection is improved.

What is claimed is:

1. A device for detecting light emitted from a light source comprising:
   (a) photo-electric transducing means; and
   (b) signal storing means for storing in different locations a first signal produced by said photo-electric transducing means when said light source emits light and a second signal produced by said photo-electric transducing means when said light source does not emit light, said signal storing means including means for recycling each of the stored first and second signals from one of the locations to another and for accumulating the first and second stored signals separately;
   (c) monitoring means for monitoring the first and second signals stored in said storing means and for judging when said first and second stored signals reach a predetermined state; and
   (d) read-out means for reading out the first and second signals stored in said storing means when the monitoring means judges that the first and second stored signals reach said predetermined state.

2. A device according to claim 1, wherein said means for recycling is arranged to recycle the first and second stored signals in synchronism with energization and de-energization of said light source.

3. A device according to claim 2, wherein said signal storing means comprises at least two signal stores and said read-out means is connected to one of said signal stores.

4. A device according to claim 3, wherein said one signal store connected to said readout means is different from another of said signal stores which is connected to said photo-electric transducing means.

5. A device according to claim 2, further comprising computing means for computing a difference between said accumulated first stored signal and said accumulated second stored signal from said signal storing means, said computing means including a capacitor and an operational amplifier having one input terminal connected to a reference voltage source and a feedback network containing a transistor.

6. A device according to claim 5, wherein said computing means includes a hold circuit for holding the computation result for a prescribed time.

7. A device according to claim 2, further comprising signal removing means for removing a certain amount of signal from the stored signal in said signal storing means.

8. A device according to claim 7, wherein said signal storing means comprises a plurality of signal stores and said signal removing means is provided for one of said signal stores.

9. A device for detecting light from a light source, comprising:
   (a) first and second photo-electric transducer means;
   (b) signal storing means for storing in different locations individual on signals produced from said respective first and second photo-electric transducing means when said light source is lit, and individual off signals from said respective first and second photo-electric transducer means when said light source is not lit, said signal storing means including means for recycling each of the on and off stored signals from one location to another and for accumulating said on and off stored signals separately;
   (c) monitoring means for monitoring the on and off signals stored in said signal storing means and for judging when said on and off stored signals reach a predetermined state;
   (d) read-out means for reading out the on and off signals stored in said signal storing means when the monitoring means judges that the on and off stored signals reach said predetermined state; and
   (e) signal removing means for removing a certain amount of signal from the one and off stored signals in said signal storing means.

10. A device according to claim 9, further comprising readout means for reading out the on and off stored signals from said signal storing means, said readout means being arranged for reading out the on and off stored signals from the signal storing means simultaneously.

11. A device according to claim 10, wherein said readout means operates at a predetermined timing with respect to recycling of the on and off stored signals.

12. A device according to claim 11, wherein said readout means includes floating gates.

* * * * *